United States Patent
Wood

[11] 4,193,190
[45] Mar. 18, 1980

[54] FILAMENT TRIMMER CUTTING HEAD IMPROVEMENT

[76] Inventor: Dale A. Wood, 1011 Wiseburg Rd., Whitehall, Md. 21161

[21] Appl. No.: 915,727

[22] Filed: Jun. 15, 1978

[51] Int. Cl.² .................. A01D 55/18; A01G 3/06
[52] U.S. Cl. ............................... 30/276; 56/12.7
[58] Field of Search ............... 30/276, 347; 56/12.7, 56/295

[56] References Cited

U.S. PATENT DOCUMENTS 3,708,967  1/1973  Geist et al. ..................... 56/12.7

FOREIGN PATENT DOCUMENTS 556632  12/1974  Fed. Rep. of Germany ........ 30/276

Primary Examiner—Jimmy C. Peters
Attorney, Agent, or Firm—John F. McClellan

[57] ABSTRACT

An anti-tangle, feed correcting improvement for line handling in a filament trimmer circular cutting head of manual-feed, commercially available type having a slotted-rim-cup-shape and holding the spool or spools of filament with cutting length of filament emerging from the slot, includes an elongate retainer fixed integrally in the cutting head across the slot at an intermediate location providing room for filament cutting-end swing above the pin and room above and below and behind the elongate retainer for manipulation to feed a fresh length of filament when necessary; in an embodiment provision is made for manually slipping the filament past an end of the elongate retainer to facilitate feeding more filament.

10 Claims, 5 Drawing Figures

FILAMENT TRIMMER CUTTING HEAD IMPROVEMENT

This invention relates generally to filament trimmers for trimming vegetation, and particularly to the cutting heads of such filament trimmer.

In the prior art it has been known to provide slotted-rim circular cutting heads for filament trimmers, the slot structure guiding the free end of the filament during cutting, and permitting downward disengagement, unwinding, and return of the free end to the slot for unspooling more filament from a spool within to compensate for filament wear and breakage. Eyelet-type guides which also are known do not permit stripping off and re-engaging filament in the same manner.

Commercially available models employing slotted-cup circular cutting head structure are available under the mark "Weedeater", and structure of the type appears in representative U.S. Pat. Nos. such as 3,859,776 to George C. Ballas et al, 1-14-75, and 3,826,068 to George C. Ballas et al, 7-30-74.

Regardless of however well these devices function in normal usage, in certain types of work, they tend to feed out line automatically when not wanted, causing tangles and jams which waste time, money and filament. These problems occur at short intervals in trimming around monuments in graveyards. In such service the non-metallic line of the filament trimmer prevents injury to the monuments while speeding the work greatly as long as the trimmer operates properly. However, the frequency of tangling and jamming in such work, as in trimming around other fixed obstacles such as wire fences, requires excessive time for reasonable production because of stopping and starting for removing the recurrent tangles of filament in the cutter head.

It is believed that this problem may have been addressed to an extent in U.S. Pat. No. 4,052,789 to G. C. Ballas, 10-11-77.

However, the simplicity, the line-preserving efficiency, economy and durability of the present invention are believed unexcellable, and have in the embodiment tested proved over the span of one full trimming season, in secret testing in graveyard trimming of the most demanding type, without any jamming or other trouble whatsoever, and the invention as embodied gives promise of continued usefulness as long as desired.

Objects of this invention therefore are to provide an improved anti-jam structure for filament trimmers of the slotted-cup-housing type, which will eliminate tangles and jams while providing ease of feed and full operating efficiency under the most severe conditions of use.

Futher objects are to provide improved structure as described which accommodate various weights of lines, which operates in all types of service without catching on objects trimmed around, and which is economical to install, safe to use, and suited for installation at the factory in existing designs with a minimum of expense and adaptation to the existing designs, and which is easily understandable and operatable by anyone who can use a filament trimmer.

In brief summary given for cursive description purposes only and not as limitation, in preferred embodiment the invention includes the improvement in slotted-cup-housings for filament trimmers of an across-the-slot elongate member loosely limiting line motion.

The above and other objects and advantages of the invention will become more readily understood on examination of the following description; including the drawings, in which:

FIG. 4b is a detail adapted from 4b—4b, FIG. 4a.

OLD ART COMPONENTS OF THE COMBINATION

Figure 1:
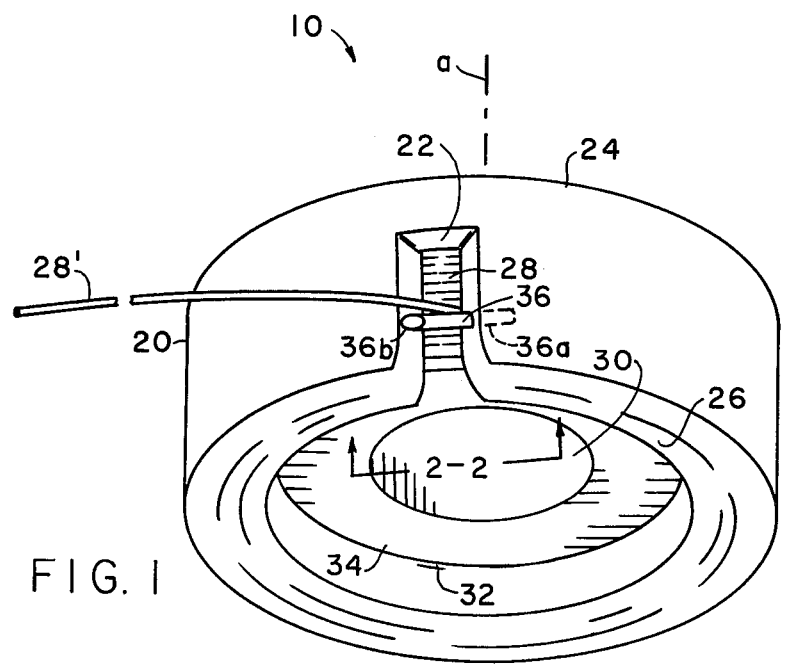
FIG. 1 is a perspective view of a slotted-cup structure with a preferred embodiment of the invention across the slot.

FIG. 1 shows a typical inverted-cup-shaped, thick wall, circular cutting head 20, like those commercially available under the mark previously mentioned, with typical parallel-sided, slot 22 extending from proximate the base 24 of the cup shape generally along the plane of a diameter, through the lip 26 of the cup shape. This slot guides the free end 28' of filament extending radially as a cutting length when the housing is spun about axis a by a conventional motor drive, not shown, for cutting vegetation with the free end of the filament. Spool 30 coaxially mounted in fixed relation with and recessed in the cutting head stores the remainder of the filament in spooled supply 28 continuous with the free end and available for replenishing when the free end is worn or broken. It will be noted that typically the cutting head wall thickness is substantial, being more than twenty five percent of the radius of the cutting head. The edges of the slot are fully radiused and the slot is high and wide, being at least four to five times as tall and also as wide as the diameter of the heaviest filament used, which is typically about 0.080 inch (3.2 mm) in diameter.

Stripping-off filament from the spooled supply to replenish the free end is, according to the old art, accomplished by grasping the filament free end, drawing it down and out of the slot, unspooling a fresh length by using an unwinding sweep of the hand to draw a loop (or a partial loop) of filament through the circular opening 32 between the lip or lower edge, of the cutting head and lower flange 34 of the spool, and then returning the free end to the slot. This arrangement permits very simple cuttinghead and spool structure to be employed, without the relative movement or other complication necessary when eyelet structure is employed.

Trouble occurs when the violent action of the free end in slapping against a fixed object being trimmed-around causes the free end to swing down out of the slot and under centrifugal force and continued violence of cutting action to draw instantaneously a quantity of filament off the spool and tangle it in knots. Not only is such entanglement difficult to cut away and time consuming, but swinging it can quickly overheat and cause damage to the motor rotating the cutting head.

THE IMPROVEMENT

Improvements of this invention broadly lie in providing in combination with the old art structure described above, an elongate member 36, the combination being designated in the first Figure as embodiment 10.

Elongate member 36 may advantageously be resilient and uniformly cylindrical in cross-section, with first end 36a friction embedded or otherwise secured in the cutting head wall on one side of the slot, and second end free but faired-in at the other wall of the slot by a bevel 36b or the like. Preferred materials for the elongate member are corrosion resistant, such as stainless steel, spring tempered bronze, or the like, 3/32 inch (3.75 mm) in diameter and long enough to embed one-third the length.

Vertical location of the transverse position of the elongate member may be at a distance about ⅓ the slot height up from the bottom of the slot, advantageously providing room above from the free end of the filament to slat around loosely while trimming, to accommodate trimming forces, while preventing the filament from moving broadside downwardly out of the slot. Radial distance of the elongate member inward may be about ¼ the wall thickness in from the wall circumference, providing room for visual access and manual manipulation of the free end in feeding filament, by threading the filament around the elongate member or pin to remove it from the slot for unwinding and then to reinsert it in the slot for trimming.

Alternatively the filament as a loop can advantageously be snapped past the second end of the elongate member manually for removal and replacement in the slot during the filament feeding operation, the elongate member resiliency being made sufficient for this, preferably.

Figure 2:
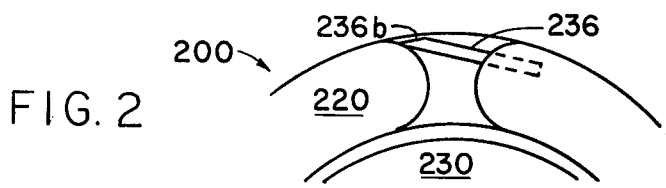
FIG. 2 is a detail adapted from 2—2, FIG. 1, but showing a second embodiment.

FIG. 2 shows a second embodiment 200 similar in all respects to the first except that the elongate member 236 is a "Roll Pin", a commercially available self-holding longitudinally split tube of spring steel, preferably corrosion resistant. Bevel of the second end 236b for fairing-in with the cutting head 220 is apparent.

In testing continued over a period of months this structure has proved that it will absolutely eliminate all tangles under all trimming conditions including the hardest commercial trimming, saving quantities of filament, and of operator time and temper. The free end does not move out of the slot, or tangle with or noticeably wear on the elongate member.

The "Roll-Pin" type structure permits a replacement elongate member to be installed without danger of unduly enlarging the hole, because of the resilient-diameter characteristic of the hollow, split "Roll-Pin".

For load support the first end of the elongate member is preferably arranged to be the trailing end relative to the direction of cutting head support in all embodiments.

Figure 3:
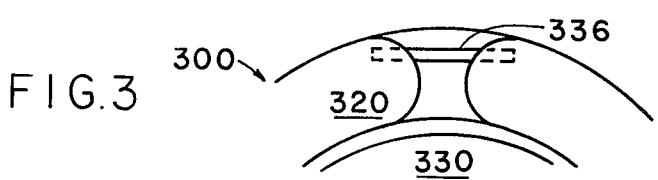
FIG. 3 is a bottom plan detail of a further embodiment.

FIG. 3 shows an embodiment 300 in which both ends of the elongate member 336 are embedded in the wall of the cutting head 320, as by molding embedment on manufacture.

Figure 4A:
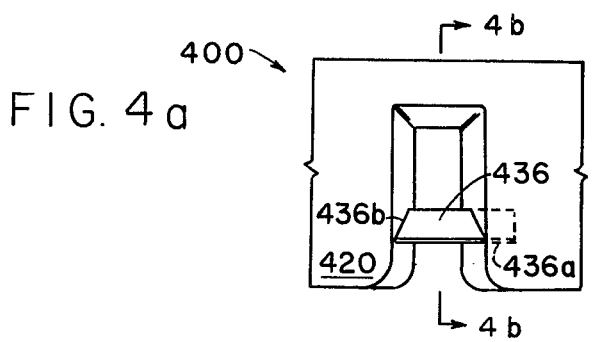
FIG. 4a is a side elevational detail of yet another embodiment.
Figure 4B:
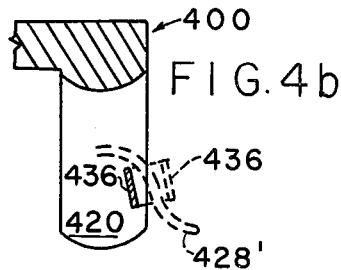

FIGS. 4a and 4b show embodiment 400, similar to the first two embodiments except that a flat spring elongate member 436 about ¼ inch wide by 5/64 inch thick (6 mm by 3.2 mm) is substituted, permitting, because of the approximately 10° top-inward angling of the spring toward the cutting head, the spring second or bevelled end 436b to be flexed out by lifting, for passing the filament between it and the cutting head. Downward loads on the spring tend to flex it inward, further forcing the bevelled end against the cutting head 420 and supporting it. This embodiment like the first and third embodiment has yet to be tested, but it is anticipated that the function of all will be satisfactory in eliminating tangling problems.

In conclusion, although the characteristically violent gyrations of the free end of the filament during cutting operations are believed to have subjected the invention to conditions so variable and erratic that the surprising performance of the invention may not be fully understood, comparison with the performance of the same filament, which fouled and tangled every four or five minutes in the same conditions of operation, fully proves the worth of the invention.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a filament trimmer cutting head of the type having inverted-cup-shape with structure defining a generally parallel-sided slot extending from proximate the base of the cup shape through the rim of the inverted cup shape for guiding filament cutting length, and having provision for manually feeding filament by drawing filament free of the slot, unwinding and replacing the filament in the slot, the improvement comprising: a pin, said pin having affixation across the slot at a location intermediate the length of the slot, providing room for said filament to be retained by the pin between the pin and the base of the inverted cup shape, thereby preventing said filament from moving downwardly out of the slot during cutting operations.

2. In a filament trimmer cutting head as recited in claim 1, said affixation of the pin being at a first end thereof, a second end of the pin being against a portion of said cutting head at the slot, and the pin being sufficiently resilient to permit the filament to be manually drawn broadside between the second end thereof and said portion of the cutting head.

3. In a filament trimmer cutting head as recited in claim 2, the second end of the pin having a bevel shape fairing it in with said cutting head portion.

4. In a filament trimmer cutting head as recited in claim 2, the second end of the pin positioned for trailing the first end thereof on rotation of the cutting head.

5. In a filament trimmer cutting head as recited in claim 2, the pin being a flat spring having top-inward angling toward the cutting head.

6. In a filament trimmer cutting head as recited in claim 5, the second end of the flat spring positioned for support against the cutting head under downward load.

7. In a filament trimmer cutting head as recited in claim 1, said pin having a first and a second end, said first and second ends affixed to said cutting head.

8. In a filament trimmer cutting head of the type having inverted-cup-shape with structure defining a generally parallel-sided slot extending from proximate the base of the cup-shape through the rim of the inverted cup-shape for guiding filament cutting length, and having provision for manually feeding filament by drawing filament free of the slot, unwinding and replacing the filament in the slot, the improvement comprising: an elongate member, said elongate member having affixation across the slot at a location intermediate the length of the slot, thereby preventing said filament cutting length from moving downwardly out of the slot during cutting operation, and the elongate member having uniform cylindrical shape in cross-section.

9. In a filament trimmer cutting head as recited in claim 8, the elongate member being of the type pin structure comprising a resilient longitudinally split tube.

10. In a filament trimmer cutting head as recited in claim 9, the second end of the elongate member having a bevel shape fairing it in with said cutting head portion.

* * * * *